(12) United States Patent
Hirayama et al.

(10) Patent No.: US 6,729,568 B2
(45) Date of Patent: May 4, 2004

(54) SPINNING REEL BAIL TRIPPING DEVICE (75) Inventors: Hirokazu Hirayama, Sakai (JP); Kouji Ochiai, Sakai (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 10/106,233

(22) Filed: Mar. 27, 2002

(65) Prior Publication Data

US 2002/0148918 A1 Oct. 17, 2002

(30) Foreign Application Priority Data

Apr. 16, 2001 (JP) ........................................ 2001-116313

(51) Int. Cl.$^7$ ................................................ A01K 89/01
(52) U.S. Cl. ...................................... 242/232; 242/233
(58) Field of Search ................................ 242/231, 232, 242/233

(56) References Cited

U.S. PATENT DOCUMENTS

| 4,932,616 | A | * | 6/1990 | McMickle et al. | ........... 242/233 |
| 5,667,159 | A | * | 9/1997 | Carpenter et al. | ........... 242/233 |
| 5,683,049 | A | * | 11/1997 | Kawabe et al. | ............. 242/232 |
| 5,820,052 | A | * | 10/1998 | Yamaguchi et al. | ........ 242/232 |
| 5,988,546 | A |   | 11/1999 | Young |  |
| 6,371,395 | B2 | * | 4/2002 | Sato | ........................... 242/232 |
| 6,382,542 | B1 | * | 5/2002 | Sato | ........................... 242/243 |
| 2001/0032901 | A1 |  | 10/2001 | Sato |  |
| 2001/0054660 | A1 |  | 12/2001 | Sato |  |

FOREIGN PATENT DOCUMENTS

| JP | 5637880 U | 4/1981 |
| JP | 172073 U | 5/1989 |

* cited by examiner

Primary Examiner—Kathy Matecki
Assistant Examiner—Evan H Langdon
(74) Attorney, Agent, or Firm—Shinjyu Global IP Counselors, LLP (57) ABSTRACT A spinning reel bail tripping device returns a bail arm from the line-releasing posture to the line-guiding posture smoothly as a rotor rotates in its line-guiding direction. The bail tripping device includes a shifting member, a switching member, and a roller. The shifting member can shift, when the bail arm pivots, between a first position corresponding to the line-guiding posture and a second position corresponding to the line-releasing posture. The shifting member has a portion that protrudes toward a front portion of the reel unit when the shifting member is in the second position. The switching member is arranged at the front of a reel unit. When the rotor rotates in line-guiding direction, the switching portion contacts the protruding portion, shifting the shifting member toward the first position. The roller is provided on the switching member at a portion contacting the shifting member, and rolls against the switching member.

18 Claims, 9 Drawing Sheets

SPINNING REEL BAIL TRIPPING DEVICE

BACKGROUND OF THE INVENTION

1. Field of the Invention

This invention generally relates to bail tripping devices. More specifically, the present invention relates to spinning reel bail tripping devices for returning a bail arm, which can be pivoted between a line-guiding posture and a line-releasing posture and is pivotably attached to a rotor that is rotatably mounted to a reel unit of a spinning reel, such that the bail arm returns from the line-releasing posture to the line-guiding posture when the rotor rotates in line-guiding direction.

2. Background Information

Typical spinning reels include a reel unit, a rotor rotatably supported by the reel unit, and a spool around which fishing line is wound. The rotor includes a first and a second arm portion that are arranged in opposition to one another, flanking the rotation axis of the rotor, and a bail arm mounted pivotably at the tips of the two arm portions.

The bail arm can assume a line-guiding posture, in which fishing line is guided to the circumference of the spool when winding up fishing line, or a line-releasing posture, in which the bail arm is toppled over from the line-guiding posture so that it does not pose a hindrance when rolling off fishing line from the spool. The rotor is provided with a bail tripping device, which maintains the bail arm in the line-guiding posture or the line-releasing posture and returns the bail arm from the line-releasing posture in the line-guiding posture when rotating the rotor in line-guiding direction.

The bail tripping device includes a shifting mechanism disposed in the rotor, which can shift between a first position corresponding to the line-guiding posture and a second position corresponding to the line-releasing posture in cooperation with a pivoting of the bail arm, and a switching portion provided on the reel unit, which can contact the shifting mechanism. In the second position, a portion of the shifting mechanism protrudes from the rear of the rotor, and the shifting mechanism is arranged such that its protruding end can contact the switching portion when the rotor rotates in the line-guiding direction.

The switching portion protrudes toward the rotor and can be formed in one piece with or separately from the flange portion, which is formed at the front of the reel unit and covers the rear of the rotor.

With a spinning reel with this configuration, when the rotor is rotated in the line-guiding direction by turning the handle while the bail arm is put in the line-releasing posture, such as for casting, the protruding end of the shifting mechanism abuts against the switching portion and contacts it in a sliding motion. Then, the shifting mechanism is pushed by the switching portion and restored from the second position to the first position, thus returning the bail arm from the line-releasing posture to the line-guiding posture.

Problems to be Solved by the Invention

In such a bail tripping mechanism, when restoring the bail arm into the line-guiding posture by turning the handle, it is desirable that the bail arm can be restored smoothly.

In this conventional configuration, however, the protruding end of the shifting mechanism always collides with the switching device when restoring the bail arm by tripping it, so that there is the risk of damaging the switching portion. When the switching portion is damaged, the friction force at the portion where the shifting mechanism contacts the switching portion increases, and it becomes difficult to restore the bail arm smoothly to the line-guiding posture.

In view of the above, there exists a need for a bail tripping device which overcomes the above mentioned problems in the prior art. This invention addresses this need in the prior art as well as other needs, which will become apparent to those skilled in the art from this disclosure.

SUMMARY OF THE INVENTION

It is an object of the present invention to provide a spinning reel bail tripping device, with which the bail arm can be restored smoothly to the line-guiding posture.

In accordance with a first aspect of the present invention, a spinning reel bail tripping device for returning a bail arm, which is fitted pivotably between a line-guiding posture and a line-releasing posture to a rotor attached rotatably to a spinning reel unit, from the line-releasing posture to the line-guiding posture in cooperation with rotation of the rotor in its line-guiding direction, includes a shifting mechanism, a switching portion and a revolving member. The shifting mechanism is provided in the rotor and can shift, when the bail arm pivots, between a first position corresponding to the line-guiding posture and a second position corresponding to the line-releasing posture. The shifting member has a portion that protrudes toward a front portion of the reel unit when in the second position. The switching portion is arranged at the front of the reel unit, and, when the rotor rotates in line-guiding direction, the switching portion contacts the protruding portion of the shifting mechanism in the second position, shifting the shifting mechanism toward the first position. The revolving member is provided either on the shifting mechanism at a portion contacting the switching portion or on the switching portion at a portion contacting the shifting mechanism, such that the revolving member rolls against the switching portion or the shifting mechanism.

With this bail tripping device, when the bail arm is in the line-releasing posture, and the rotor is rotated in the line-guiding, direction by turning the handle, the protruding end of the shifting, mechanism abuts against the switching portion, and the shifting mechanism is shifted from the second position to the first position, returning the bail arm to the line-guiding posture. During the collision, the revolving member provided on either the shifting mechanism or the switching portion collides with the other component (i.e. switching portion or shifting mechanism), so that after the collision, the revolving member rotates and rolls against the other component. Thus, when the shifting mechanism or the switching portion collides with the revolving member, neither will be damaged, and due to the rolling contact, also the friction force is not large. Consequently, the bail arm can be restored smoothly to the line-guiding posture.

According, to a second aspect of the present invention, in a spinning reel bail tripping device as in the first aspect, the shifting mechanism includes a shifting member, a first end of which is located near the pivot center of the bail arm and interlocked rotatably with said bail arm at a position that, when the bail arm is in the line-releasing posture, is on a line-guiding posture side of a line segment joining a second end of the shifting member and said pivot center, wherein the second end of the shifting member shifts back and forth in cooperation with the pivoting of the bail arm. With this configuration, when the bail arm pivots into the line-releasing posture, the second end of the shifting member is shifted rearward, and protrudes to a position at which it can contact the switching member. Then, when the rotor is rotated in the line-guiding direction, the second end of the protruding shifting member contacts the switching portion and the shifting member is pushed frontward, returning the bail arm to the line-guiding posture. Here, because the shifting member acts directly between the bail arm and the switching portion, the force is transmitted smoothly and the configuration of the shifting mechanism is simplified, so that the bail can be tripped reliably and the manufacturing costs of the bail tripping device can be reduced.

According to a third aspect of the present invention, in a spinning reel bail tripping device as in the second aspect, the shifting member is a rod-shaped member, whose first end is bent toward a vicinity of the pivoting center of the bail arm and extends along the pivot axis, and whose second end is bent toward a rotation axis of the rotor, and between the first end and the second end, the shifting member is arranged so as to extend along a rotation axis of the rotor. The second end is engaged with the rotor, such that it can be shifted back and forth. With this configuration, when the bail arm is pivoted, one end of the shifting member, which extends along the pivot axis and is interlocked with the bail arm, revolves around the pivot axis. Thus, the second end of the shifting member, which is arranged in opposition to the rotation axis of the rotor, is shifted horizontally, interlocked with the rotor. Here, by simply interlocking the bent first end of the rod-shaped shifting member with the bail arm and interlocking the second end such that it can be shifted back and forth, the pivoting motion of the bail arm can be converted easily and with a simple configuration into a horizontal linear motion of the second end of the shifting member.

According to a fourth aspect of the present invention, in a spinning reel bail tripping device as in the third aspect, the revolving member is a cylindrical member that is mounted rotatably to the second end of the shifting member. With this configuration, the revolving member has a simple configuration, in which a cylindrical member is rotatably mounted on the rod-shaped shifting member.

According to a fifth aspect of the present invention, in a spinning reel bail tripping device as in any of the second to fourth aspects, the shifting mechanism comprises a toggle spring mechanism whose one end is rotatably interlocked with the bail arm at a position that is different from the shifting member, and that toggles and urges the bail arm into the line-guiding posture and the line-releasing posture. With this configuration, the bail arm is kept in its two postures by a toggle spring mechanism.

According to a sixth aspect of the present invention, in a spinning reel bail tripping device as in any of the second to fifth aspects, the switching portion has an inclined surface whose downstream side in the line-guiding rotation direction of the rotor protrudes from the front of the reel unit towards the rotor more than its upstream side. With this configuration, when the bail arm is in the line-releasing posture and the rotor is rotated in the line-guiding direction, the revolving member mounted to the second end of the shifting member (or the inclined surface) collides with the inclined surface (or the second end), and the shifting member gradually retreats (moves frontward) while the revolving member rotates, returning the bail arm to the line-guiding posture. Thus, the shifting member retreats smoothly, and the bail arm can be restored smoothly into the line-guiding posture.

According to a seventh aspect of the present invention, in a spinning reel bail tripping device as in the first aspect, the shifting mechanism includes a toggle spring mechanism whose first end is mounted rotatably to a position near the pivot center of the bail arm, and which is pivotably interlocked with the rotor at an intermediate position of the toggle spring mechanism, and a return lever interlocking with a second end of the toggle spring mechanism and mounted to a rear wall of the rotor, pivotably around an axis parallel to the rotation axis of the rotor, wherein a tip of the return lever contacts the switching portion. With this configuration, when the bail arm is pivoted into the line-releasing posture, the return lever pivots into a position in which it can contact the switching portion. Then, when the rotor is rotated in the line-guiding direction, the return lever contacts the switching portion and pivots to its original position, and this pivoting causes the toggle spring mechanism to pivot as well, restoring the bail arm to the line-guiding posture. Here, the return lever pivots only around an axis parallel to the rotation axis of the rotor, so that the shifting mechanism can be accommodated compactly in the rotor.

According to an eighth aspect of the present invention, in a spinning reel bail tripping device as in the seventh aspect, the switching portion has an inclined surface whose downstream side in the line-guiding rotation direction of the rotor protrudes more in radial direction than its upstream side. With this configuration, when the bail arm is in the line-releasing posture and the rotor rotates in the line-guiding direction, the revolving member mounted to the tip of the return lever (or to the switching portion) abuts against the inclined surface (or the return lever) and pivots in a retreating direction, so that the bail arm is returned to the line-guiding posture via the toggle spring mechanism. Therefore, the return member can be pivoted smoothly, and the bail arm can be restored smoothly into the line-guiding posture via the toggle spring mechanism.

According to a ninth aspect of the present invention, in a spinning reel bail tripping device as in the seventh or eighth aspects, the revolving member is mounted rotatably to a tip of the return member. With this configuration, the revolving member is mounted to the pivoting return member, so that smooth contact with the switching portion is possible with one revolving member.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

First Embodiment

Figure 1:
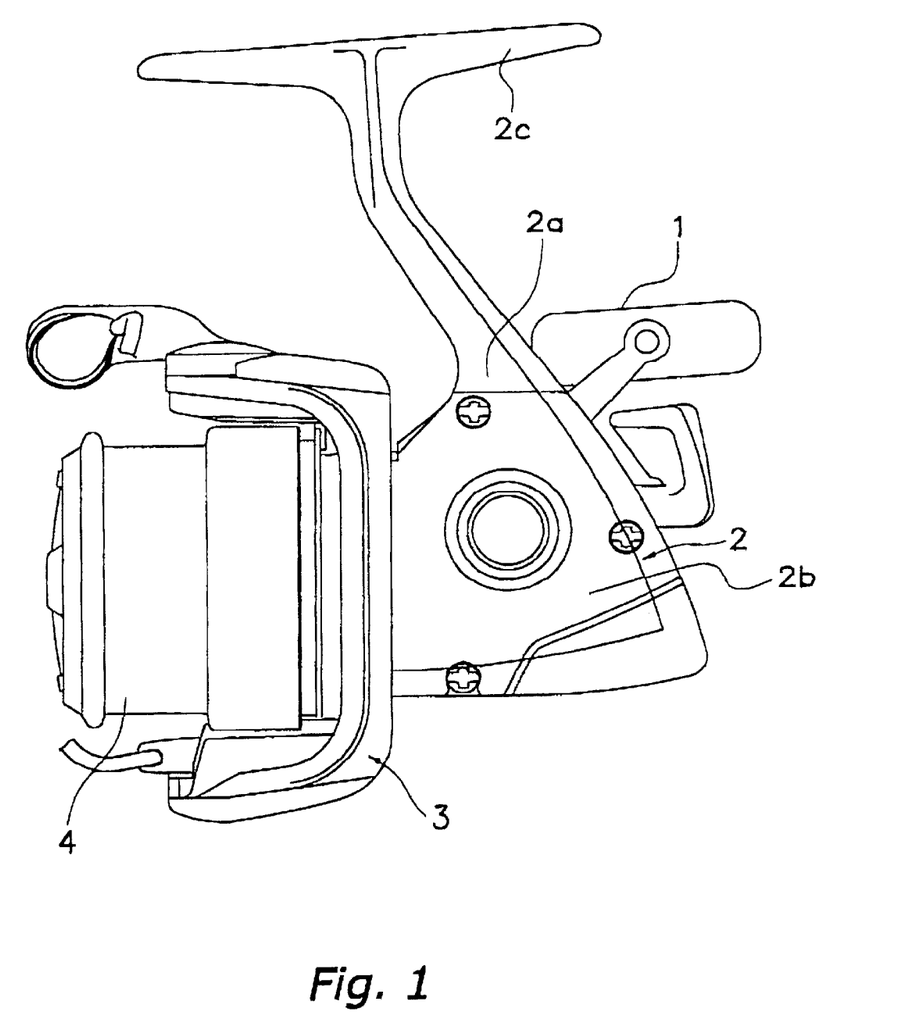
FIG. 1 is a right side lateral view of a spinning reel in accordance with an embodiment of the present invention.

As shown in FIG. 1, a spinning reel in accordance with an embodiment of the present invention includes a handle 1, a reel unit 2 rotatably supporting the handle 1, a rotor 3, and a spool 4. The rotor 3 is rotatably supported at the front of the reel unit 2. The fishing line is wound around the outer peripheral surface of the spool 4, which is disposed at the front of the rotor 3 and can be shifted back and forth.

The reel unit 2 includes a reel body 2a provided with a space inside and a lid member 2b mounted detachably to the reel body 2a, shutting the space in the reel body 2a.

Figure 2:
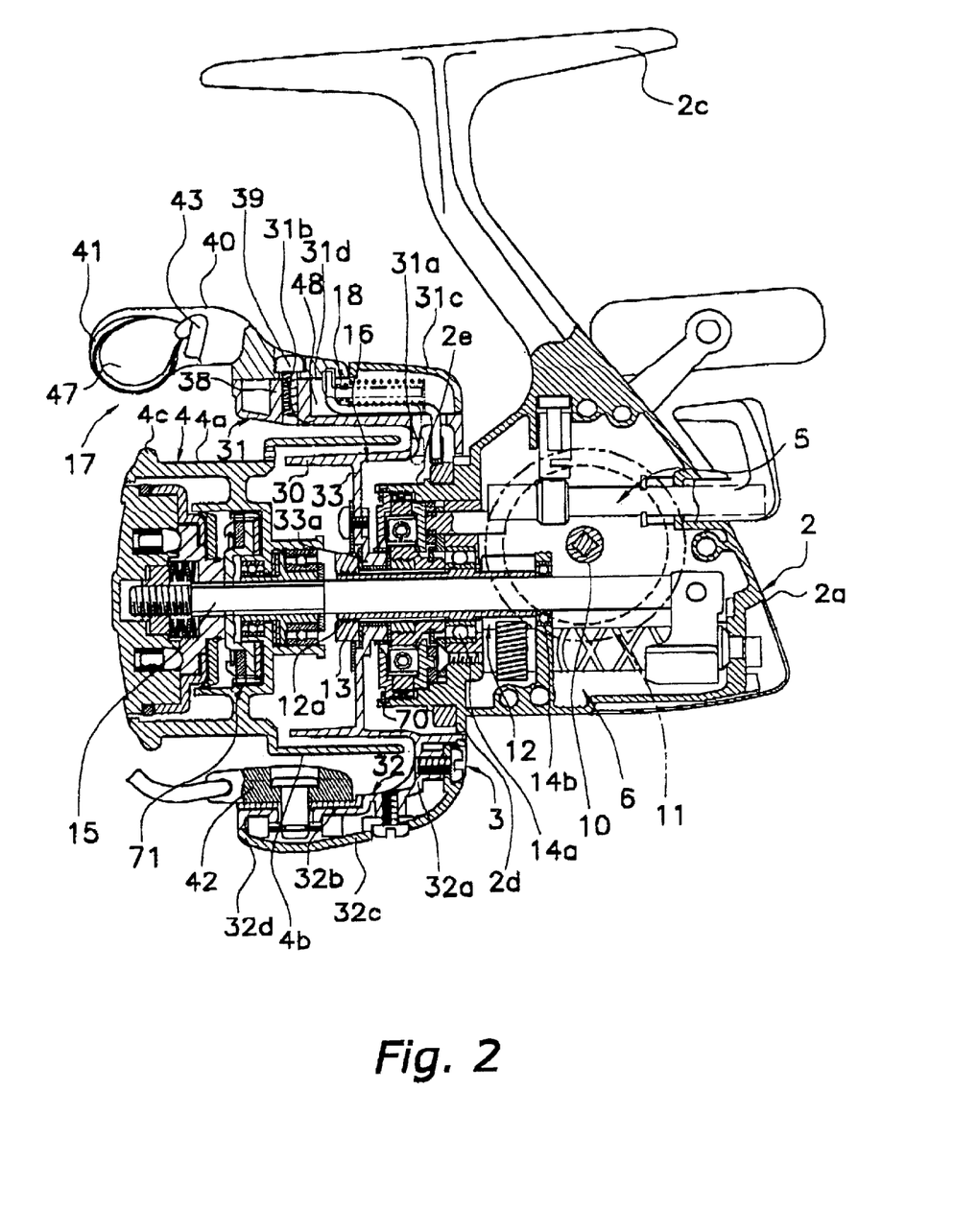
FIG. 2 is a left side lateral cross-sectional view of the spinning reel in accordance with the embodiment.
Figure 5:
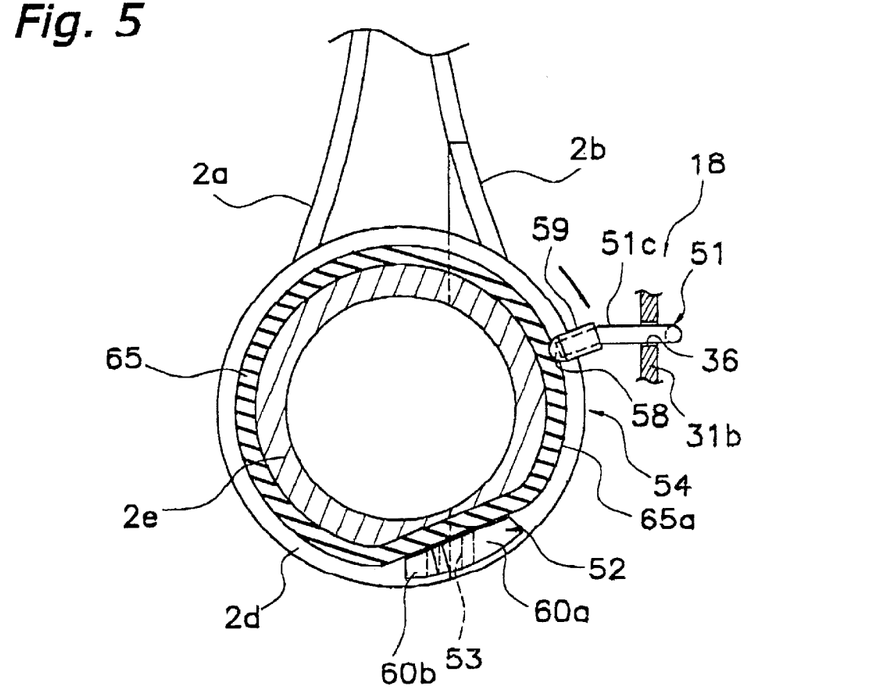
FIG. 5 is a front view of the reel body, illustrating the bail tripping mechanism.

The reel body 2a is made of, for example, a magnesium alloy, and is formed in one piece with a T-shaped rod attachment leg 2c extending horizontally at the top of the reel body 2a. As shown in FIG. 2, the space in the reel body 2a accommodates a rotor driving mechanism 5 transmitting the rotation of the handle 1 to rotate the rotor 3, and an oscillation mechanism 6 for winding up the fishing line uniformly by shifting the spool 4 back and forth. A circular flange portion 2d and a cylindrical portion 2e are formed on the front of the reel body 2a and the lid member 2b. The cylindrical portion 2e is open to the front and its diameter is smaller than that of the flange portion 2d. As shown in FIG. 5, the cross section of the cylindrical portion 2e is D-shaped, like a dented circle.

Figure 6:
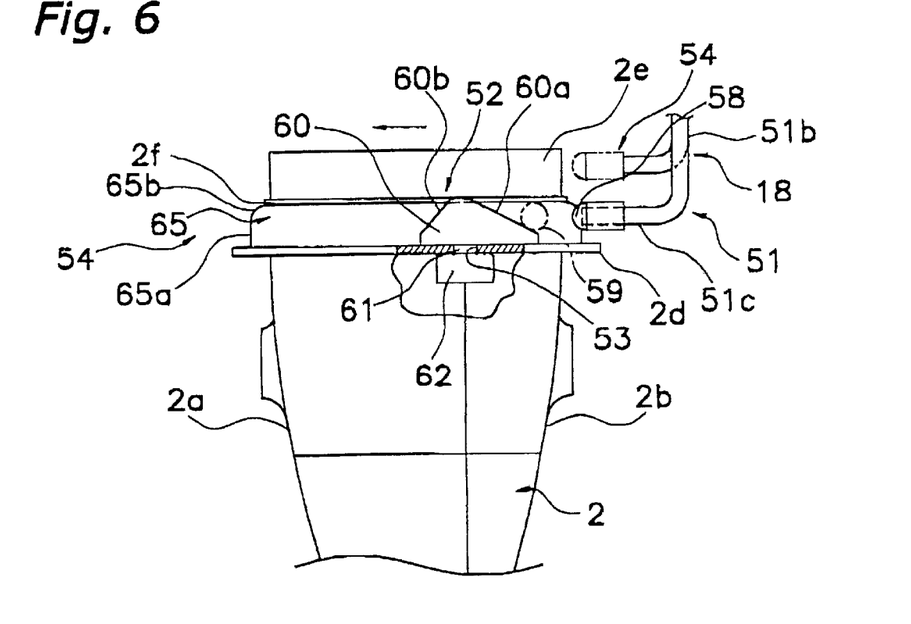
FIG. 6 is a partial bottom view of the reel body, illustrating the bail tripping mechanism.

The lid member 2b is made of, for example, a magnesium alloy, and screwed at three locations to the reel body 2a. As shown in FIGS. 5 and 6, a switching member 52, explained in more detail below, is mounted detachably to the flange portion 2d at the portion where the reel body 2a and the lid member 2b can be taken apart.

As shown in FIG. 2, the rotor driving mechanism 5 includes a handle shaft 10, a face gear 11 and a pinion gear 12. The face gear 11 rotates together with the handle shaft 10, on which the handle 1 is mounted non-rotatably. The pinion gear 12 meshes with the face gear 11. The pinion gear 12 is tubular. Its front portion 12a penetrates the center of the rotor 3, and is fixed with a nut 13 to the rotor 3. The middle and the rear end (with respect to the axial direction) of the pinion gear 12 are rotatably supported by bearings 14a and 14b in the reel unit 2.

The oscillating mechanism 6 shifts the spool 4 back and forth, shifting back and forth the spool shaft 15 to which the center of the spool 4 is coupled via a drag mechanism 71.

Rotor Configuration

As shown in FIG. 2, the rotor 3 includes a rotor unit 16, a bail arm 17, and a bail tripping mechanism 18. The bail arm 17 is disposed to the front of the rotor unit 16 and is pivotable between a line-releasing posture and a line-guiding posture. The bail tripping mechanism 18 is mounted to the rotor unit 16 and is for returning the bail arm 17 into the line-guiding posture.

The rotor unit 16 includes a cylindrical portion 30, a first rotor arm 31 and a second rotor arm 32. The cylindrical portion 30 is attached to the reel body 2a and can rotate freely around the spool axis 15. The first rotor arm 31 and the second rotor arm 32 are arranged in opposition to one another on the sides of the cylindrical portion 30. The cylindrical portion 30, the first rotor arm 31 and the second rotor arm 32 can be made of, for example, an aluminum alloy, and are formed in one piece.

A front wall 33 is formed at the front of the cylindrical portion 30, and a boss portion 33a is formed in the center of this front wall 33. A through hole is formed in the center of the boss portion 33a, and the front end 12a of the pinion gear and the spool shaft 15 are passed through this through hole. The nut 13 is provided to attach the rotor 3 to the front of the front wall 33.

Figure 3A:
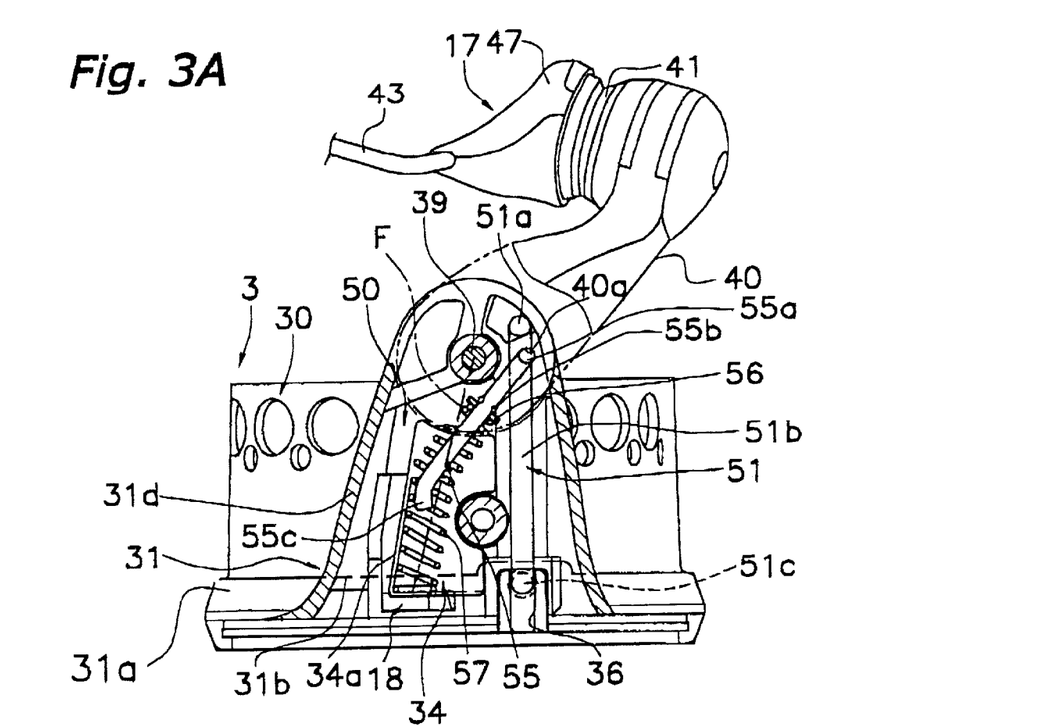
FIG. 3A is a plan view of the first rotor arm in which the bail arm is in the line-guiding posture.
Figure 3B:
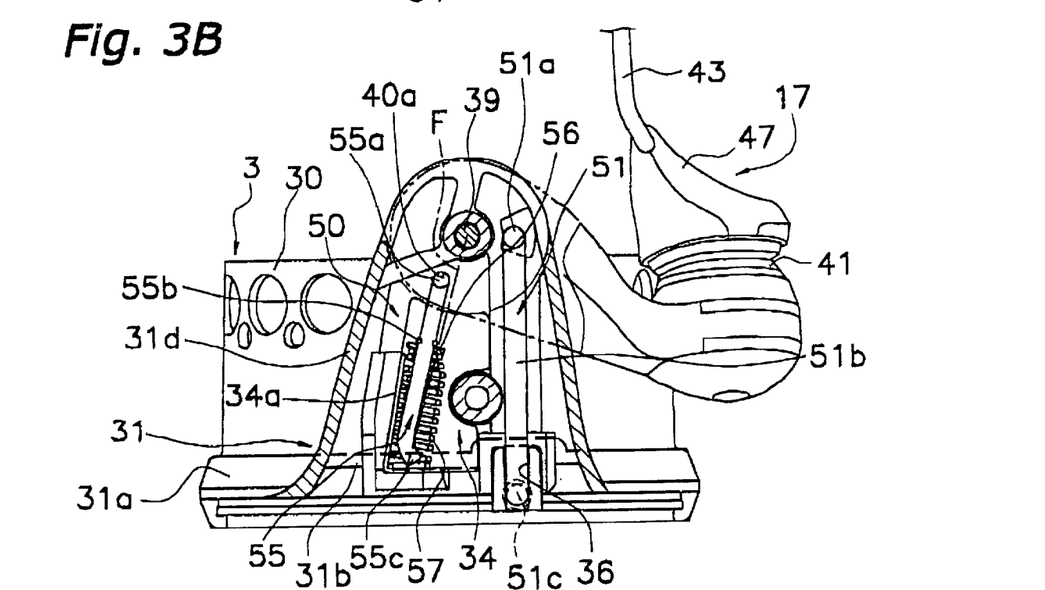
FIG. 3B is a plan view of the first rotor arm in which the bail arm is in the line-releasing posture.
Figure 4:
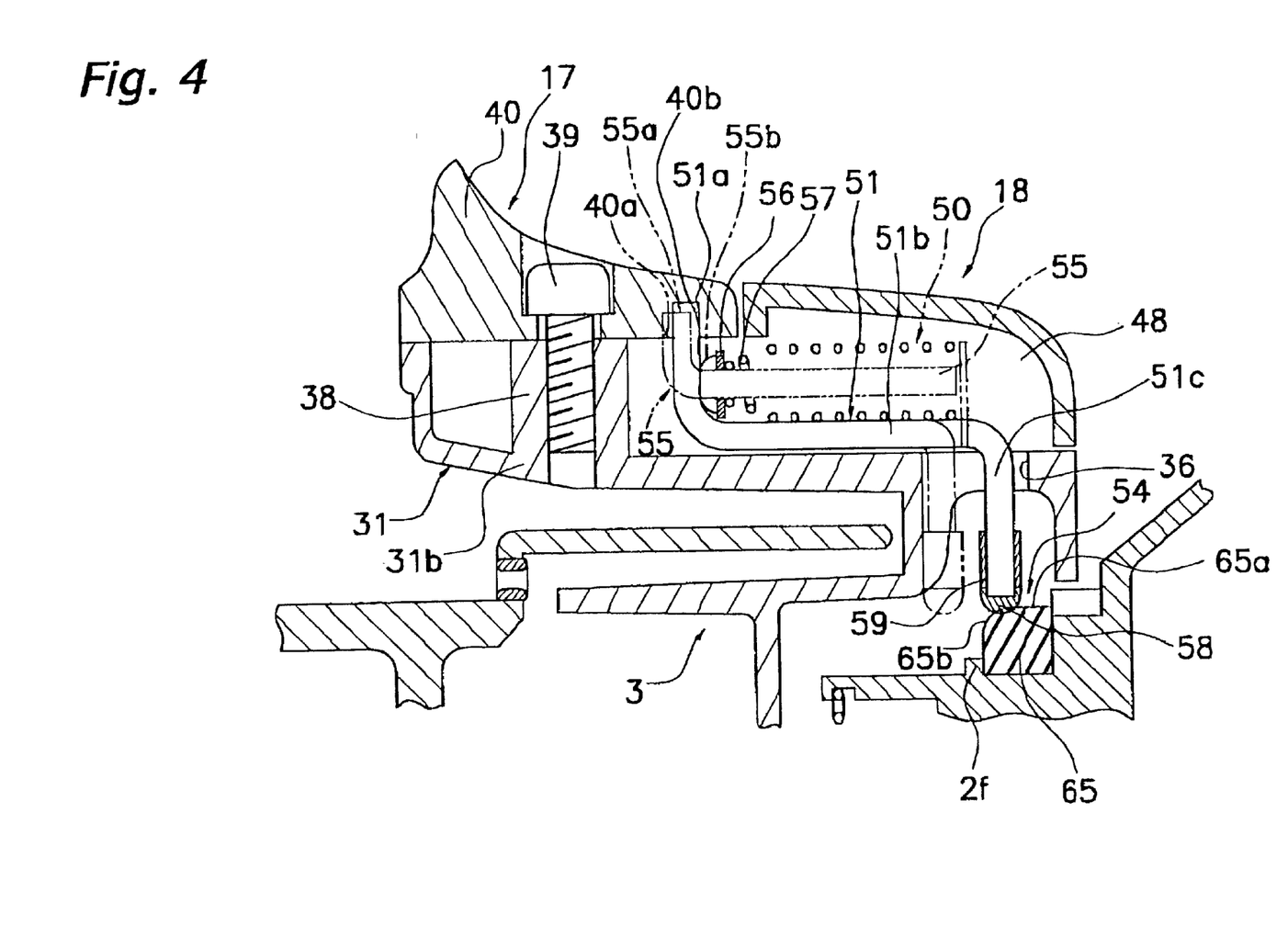
FIG. 4 is a magnified cross-sectional view of the first rotor arm.

As shown in FIGS. 2 to 4, the first and second rotor arms 31 and 32 respectively include first and second connection portions 31a and 32a arranged at a peripheral surface at the rear of the cylindrical portion 30, first and second arm portions 31b and 32b curving out and extending frontward from the first and second connection portions 31a and 32a, and first and second cover members 31c and 32c covering the outer portions of both the two connection portions 31a and 32a and the two arm portions 31b and 32b. The first and second connection portions 31a and 32a are formed in smooth circumferential continuation of the cylindrical portion 30.

The first and second arm portions 31b and 32b are formed in smooth continuation of the first and second connection portions 31a and 32a, and extend frontward, keeping a certain distance to the cylindrical portion 30. The first and second arm portions 31b and 32b form a smooth curve from their tips to the portion where they are connected to the cylindrical portion 30. Apertures 31d and 32d are provided in outward portions of both the two connection portions 31a and 32a and the two arm portions 31b and 32b, and the first and second cover member 31c and 32c close the apertures 31d and 32d from outside. An accommodation space 48 is formed between the first cover member 31c, the first connection portion 31a and the first arm portion 31b.

A first bail support member 40 is mounted pivotably to an outer side at the tip of the first arm portion 31b. As shown in FIG. 4, the first arm portion 31b is provided with a slot 36 for mounting the bail tripping mechanism 18, and with a threaded boss portion 38 for pivotably mounting the first bail support member 40.

The second bail support member 42 is mounted pivotably to the inner tip of the second rotor arm 32b.

The first bail support member 40 is attached with a threaded attachment pin 39 to the first rotor arm 31 at the boss portion 38 of the first arm 31b. The attachment pin 39 is made of a bolt with a hexagonal hole and smooth edges, such that the fishing line does not get caught at its screw head.

As shown in FIG. 3, a line roller 41 for guiding fishing line to the spool 4 and a fixed shaft cover 47 are fixed to the front of the first bail support member 40, with the line roller 41 being arranged between the first bail support member 40 and the fixed shaft cover 47. The line roller 41 is mounted rotatably to the front end of the first bail support member 40. The fixed shaft cover 47 is shaped like a deformed cone with a sharpened tip. A bail 43, made by bending a wire into U-shape, is fixed between the tip of the fixed shaft cover 47 and the second bail support member 42. The first and second bail support members 40 and 42, the line roller 41, the bail 43, and the fixed shaft cover 47 constitute the bail arm 17, which guides the fishing line to the spool 4. The bail arm 17 can be pivoted between a line-guiding posture shown in FIG. 3A and, tripping the bail arm 17 over from the line-guiding posture, a line-releasing posture shown in FIG. 3B.

Bail Tripping Mechanism Configuration

The bail tripping mechanism 18 is disposed in the accommodation space 48 of the first rotor arm 31. When the rotor 3 is rotated, the bail tripping mechanism 18 restores the bail arm 17 from the line-release posture to the line-guiding posture. Furthermore, the bail tripping mechanism 18 assists in holding the two postures.

As shown in FIGS. 3 to 6, the bail tripping mechanism 18 includes a toggle spring mechanism 50, a shifting member 51, a switching member 52, and a rotor braking mechanism 54. The toggle spring mechanism 50 is disposed within the accommodation space 48 and mounted pivotably to the first arm portion 31*b*. The shifting member 51 is also disposed in the accommodation space 48 and can be shifted approximately back and forth. The switching member 52 is mounted detachably on the flange portion 2*d*, such that it can contact the shifting member 51. The rotor braking mechanism 54 includes a braking member 65 for braking the rotor 3.

As shown in FIG. 3, the toggle spring mechanism 50 is arranged inside the first rotor arm 31, and can assume a first position, in which the bail arm 17 is in line-guiding posture, and a second position, in which the bail arm 17 is in line-releasing posture. The toggle spring mechanism 50 serves as a mechanism for holding the bail arm 17 in line-guiding posture or in line-releasing posture. The toggle spring mechanism 50 includes a rod 55 and a coil spring 57. One end of the rod 55 is interlocked with the first bail support member 40, and the other end extends along the first arm portion 31*b*. The coil spring 57 urges the rod 55 outward.

As shown in FIG. 4, the rod 55 has at its front end an interlocking portion 55*a*, which is bent towards the first bail support member 40 and is engaged with an engagement hole 40*a* formed in the first bail support member 40. The rod 55 includes, at an intermediate portion, an interlocking protrusion 55*b* interlocking with the tip of the coil spring 57. As seen in FIG. 3, the rod 55 also includes a slightly curved portion 55*c* at its rear end. At the interlocking protrusion 55*b*, a washer 56 is provided, against which the front end of the coil spring 57 abuts. Thus, a force is transmitted uniformly from the front end of the coil spring 57 to the rod 55.

Referring to FIG. 3, the coil spring 57 is guided along a guidance sheet 34 made of a synthetic resin, such as Nylon 66, attached to the arm portion 31*b*. The guidance sheet 34 includes a wall portion 34*a* that is bent such that it guides one side face of the coil spring 57 and engages the base end of the coil spring 57. The wall portion 34*a* has a height at which it can contact the side and the base end of the coil spring 57. Thus, the coil spring 57 cannot only be compressed easily, but also does not damage the arm portion 31*b* when being compressed.

As seen in FIG. 4, the front end of the coil spring 57, which engages the washer 56, has a smaller coil diameter than the rest of the coil spring 57. Thus, at the other portions besides the front end, there is a large gap between the coil spring 57 and the rod 55, and the coil spring 57 is hardly deformed even when the rod 55 changes its posture within the coil spring 57. Alternatively, the coil spring 57 can be coupled by providing provide a boss portion that contacts the inner peripheral surface of the base end of the coil spring 57, or a cover portion that covers the outer peripheral surface at the base end. Furthermore, it is also possible to attach such a boss portion or cover portion to the arm portion 31*b*, such that they are pivotable around an axis parallel to the pivot axis of the first bail support member 40. For example, it is conceivable that the base end surface of the boss portion is provided with a circular arc-shaped protrusion, and the arm portion 31*b* is provided with a circular arc-shaped recess engaging the circular arc-shaped protrusion, such that the boss portion is pivotable.

As seen in FIG. 3A and he toggle spring mechanism 50 is disposed such that the position where the rod 55 interlocks with the first bail support member 40 is located on different sides of a line F in the line-guiding posture and the line-releasing posture. The line F is the line joining the center of the base end of the coil spring 57 (which serves as the pivot axis) and the pivot axis of the first bail support member 40 (axis of the attachment pin 39). Thus, the toggle spring mechanism 50 toggles and urges the bail arm 17 into the two postures, retaining it in either posture.

The shifting member 51 is a wire made of metal such as stainless steel. Its two ends are bent over into differently-directed 90° angles. The shifting member 51 can shift within the first arm portion 31*b* substantially horizontally between a withdrawn position shown in FIG. 3A and a contact position shown in FIG. 3B. As shown in FIGS. 3 to 6, the front end portion 51*a* of the shifting member 51 is bent to the outside and engaged with an engagement groove 40*b* formed in the first bail support member 40. The middle portion 51*b* extends along the first arm portion 31*b*, radially inward of the rod 55. The rear end portion 51*c* of the shifting member 51 is bent over from the middle portion 51*b* and bends towards the center of the rotor 3. The rear end portion 51*c* extends through the slot 36 inward to a position where it slightly overlaps the front surface of a braking member 65 fitted to the base of the cylindrical portion 2*e*. A cap 58 whose tip is rounded into a spherical shape is fastened, for example by press-fitting, to the tip of the rear end portion 51*c*. Adjacent to the cap 58, a roller 59 (an example of revolving member) is mounted rotatably to the rear end portion 51*c*. The roller 59 is disposed at a position where it can contact the switching member 52. As a result, the cap 58 can contact the braking member 65.

The width of the slot 36 is of roughly the same dimension as the diameter of the shifting member 51. Therefore, the rear end portion 51*c* of the shifting member 51 shifts back and forth along the slot 36 in cooperation with pivoting of the bail arm 17.

When the bail arm 17 is in the line-releasing posture, the end of the shifting member 51 that interlocks with the engagement groove 40*b* is positioned on the line-guiding posture side (left hand side in FIG. 3B) relative to a line segment that connects the rear end portion 51*c* and the pivot center of the bail arm 17. That is, the shifting member 51 is arranged, both while the shifting member is in the withdrawn position and in the contact position, such that point at which the shifting member 51 interlocks with the first bail support member 40 is on the same side relative to a line segment joining the pivot axis of the first bail support member 40 and the axis of the rear end portion 51*c* (FIG. 3B) while the shifting member 51 is in the contact position. Thus, when the rear end portion 51*c* of the shifting member 51 is pressed by the switching member 52, the first bail support member 40 is brought back into the line-guiding posture. When in this contact position, the tip of the cap 58 is tilted inward into the braking member 65 somewhat from its circumferential face, depth-ward from the front-end face of the braking member 65. Therefore, even when the amount by which the shifting member 51 shifts slightly fluctuates, the same braking force is always gained.

The switching member 52 is made of a synthetic resin, such as Nylon 66 or polyacetal. As shown in FIGS. 5 and 6, the switching member 52 is mounted detachably on the flange 2d at the portion where the reel body 2a and the lid member 2b can be taken apart. The portion where the reel body 2a and the lid member 2b can be taken apart is provided with a rectangular cut-out 53. The switching member 52 includes a roughly triangular cam portion 60 having two inclined surfaces 60a and 60b, and a neck portion 61 and a brim portion 62, formed in one piece with the cam portion 60. The inclined surface 60a is an oblique face whose downstream end in the fishing line take-up rotation direction (indicated by the arrow in FIG. 6) of the rotor 3 (left hand side end in FIG. 6) protrudes more toward the rotor 3 (upward in FIG. 6) than the upstream end (right hand side end in FIG. 6). The inclined surface 60b is an oblique face whose protrusion amount decreases toward the downstream side in the fishing line take-up rotation direction from the protrusion portion of the inclined surface 60a. The size of the neck portion 61 is such that the neck portion 61 can be fitted into the cut-out 53, and the gap between the cam portion 60 and the brim portion 62 is approximately of the same dimension as the wall thickness of the flange portion 2d. The brim portion 62 has a larger cross-section than the neck portion 61, and contacts the back of the flange portion 2d. This inclined surface 60b ensures that when the bail arm 17 is in the line-releasing posture and the shifting member 51 is yanked with unnecessary force against the switching member 52 by reverse rotation (rotation in the direction rolling off line), the shifting member 51 of the bail tripping mechanism 18 is guided smoothly by the inclined surface 60b to the switching member 52, so that it is not easily damaged. It should be noted that such switching member 52 with the two inclined surfaces 60a and 60b can be realized as a switching portion that is formed in one piece with the reel unit 2.

When the lid member 2b is attached to the reel body 2a, the switching member 52 can be fixed to the reel body 2a simply by fitting the neck portion 61 into the cut-out 53 on the side of the reel body 2a and fastening the lid 2b on the reel body 2a with screws. Thus, the switching member 52 can be fastened to the reel unit 2 in a straightforward manner without a need for other parts for fastening the switching member 52. Furthermore, since the switching member 52 contacting the shifting member 51 is provided separately from the reel unit 2, the reel unit 2 is not damaged when the bail arm 17 is tripped over. Therefore, even though the reel unit 2 is made of a magnesium alloy susceptible to corrosion, corrosion due to such damage can be prevented. Furthermore, the switching member 52 mounted on the reel unit 2 is made of an insulating synthetic resin, so that the reel unit 2 is not subject to galvanic corrosion when the switching member 52 contacts the reel unit 2.

Rotor Braking Mechanism

The rotor braking mechanism 54 brakes the rotor 3 when the bail arm 17 has pivoted into the line-releasing posture. The rotor braking mechanism 54 includes the shifting member 51 and the braking member 65 disposed on the base end of the cylindrical portion 2e. This means that the shifting member 51 is not only a part of the bail tripping mechanism 18, but also a part of the rotor braking mechanism 54.

The purpose of the braking member 65 is to brake the rotation of the rotor 3 when the bail arm 17 is in the line-releasing posture. The braking member 65 is an elastic ring with rectangular cross section made of a synthetic rubber, such as styrene-butadiene rubber (SBR), acrylonitrile-butadiene rubber, butadiene rubber, isoprene rubber, chloroprene rubber, silicone rubber or urethane rubber. The outer peripheral surface of the braking member 65 is provided with an even peripheral braking surface 65a, except at the portion evading the switching member 52. The braking member 65 is mounted on the base of the cylindrical portion 2e, which has a D-shaped cross section. Consequently, the braking member 65 is mounted in D-shape when viewed from the front. The straight portion of the braking member 65 is provided to leave room for the switching member 52. At the front edge of the braking surface 65a of the braking member 65, a guiding surface 65b is formed in continuation to the braking surface 65a. The guiding surface 65b is formed on the side facing the shifting member 51, such that the side that faces the shifting member 51 recedes further away from the shifting member 51 than the side that is away from the shifting member 51. In this embodiment, the guiding surface 65b is formed as a rounded surface that is rounded in continuation with the braking surface 65a. Forming such an oblique guiding surface 65b in continuation with the braking surface 65a achieves that when the shifting member 51 contacts the braking member 65, the rounded cap 58 mounted on the shifting member 51 contacts the guiding surface 65b of the braking member 65 first before it smoothly contacts the braking surface 65a. Therefore, the switching of the positions of the bail arm 17 is performed in a smooth manner. An annular protrusion 2f is formed on the outer peripheral surface of the cylindrical portion 2e at a certain space from the flange 2d, and the braking member 65 is disposed between the flange 2d and the annular protrusion 2f, in contact with both.

With such a bail tripping mechanism 18, the toggle spring mechanism 50 can assume a first position as shown in FIG. 3A and a second position as shown in FIG. 3B. The first position corresponds to the line-guiding posture of the bail arm 17, and the second position corresponds to the line-releasing posture of the bail arm 17. Furthermore, the shifting member 51 is shifted back and forth between the first position (withdrawn position) shown in FIG. 3A and the second position (contact position shown) in FIG. 3B, the rear end portion 51c of the shifting member 51 being guided by the slot 36. The first position (withdrawn position) corresponds to the line-guiding posture, whereas the second position (contact position) corresponds to the line-releasing posture. In the second position (contact position), the cap 58 mounted to the rear end portion 51c of the shifting member 51 contacts the braking surface 65a such that it is slightly compressed depth-ward from the front-end face of the braking member 65. Therefore, even if the shifting position, i.e. the second position (contact position), of the shifting member 51 fluctuates in the axial direction, the braking force does not fluctuate.

Further, in the second position (contact position), when the rotor 3 is rotated with the handle 1 in the direction taking up line, the peripheral face of the roller 59 mounted to the rear end portion 51c of the shifting member 51 abuts against the inclined surface 60a of the switching member 52 and rotates, pressing the shifting member 51 forward, toward the first position (withdrawn position). When colliding, the roller 59 abuts against the switching member 52, so that after the collision, the roller 59 rotates and contacts the switching member 52 in a rolling motion. Therefore, neither the switching member 52 nor the roller 59 are damaged by the collision, and due to the rolling contact, also the friction force is not large. Consequently, the bail arm 17 can be restored smoothly to the line-guiding posture.

As shown in FIG. 2, a reverse rotation check mechanism 70 for blocking and releasing reverse rotation of the rotor 3 is provided inside the cylindrical portion 30 of the rotor 3. This reverse rotation check mechanism 70 has a roller-type one-way clutch and blocks or releases the reverse rotation of rotor 3 by switching the one-way clutch between an operating state and a non-operating state.

The spool 4 is arranged between the first rotor arm 31 and the second rotor arm 32 of the rotor 3, and is disposed at the front end of the spool shaft 15 with the drag mechanism 71 interposed between the spool shaft 15 and the spool 4. The spool 4 includes a bobbin trunk portion 4a for winding fishing line around its circumference, a skirt portion 4b formed unitarily with the rear of the bobbin trunk portion 4a, and a flange portion 4c formed unitarily with the front of the bobbin trunk portion 4a.

Function and Operation of the Reel

When casting, the reverse rotation check mechanism 70 blocks reverse rotation of the rotor 3, and the bail arm 17 trips into line-releasing posture. Tripping the bail arm 17 into the line-releasing posture causes the first bail support member 40 and the second bail support member 42 to flip over backwards, so that the bail tripping mechanism 18 assumes the second position shown in FIG. 3B. When the bail arm 17 has flipped into the line-releasing posture, fishing line can be rolled off easily from the spool 4.

As the bail arm 17 shift from the line-guiding posture to the line-releasing posture, the rotation of the first bail support member 40 causes the rod 55 in the toggle spring mechanism 50 to pivot in counter-clockwise direction in FIG. 3A while retreating gradually, thereby assuming the second position shown in FIG. 3B. In this situation, the rod 55 retreats until it crosses the dead point. Upon the rod 55 crossing the dead point, the spring force of the coil spring 57 pushes the rod 55 out, whereby the bail arm 17 switches to the line-releasing posture, which is held by the spring force.

As the bail arm 17 pivots into the line-releasing posture, the shifting member 51 shifts from the withdrawn position to the contact position, and the cap 58 mounted to the rear end portion 51c of the shifting member 51 elastically contacts the braking member 65. This brakes the rotor 3 and holds its rotational orientation. The shifting member 51 elastically contacts the braking member 65 and brakes the rotor 3 only by friction, so that the rotational orientation of the rotor 3 can be easily adjusted by turning it by hand or with the handle 1. This means, the rotational orientation is maintained by the frictional force braking the rotor 3, so that the rotor 3 does not rotate when the bail arm 17 is in the line-releasing posture. This counters the problem that the rotor 3 suddenly starts to rotate when casting or feathering. Also, since the rotor 3 is braked by friction only, it is easy to adjust its rotational orientation by applying a force to the rotor 3.

In this situation, the fishing rod is cast while holding fishing line with the index finger of the hand with which the fishing rod is held. Thus, fishing line is released with high momentum due to the weight of the tackle.

After the casting, when the handle 1 is turned, for example with the left hand, in the direction taking up line while the bail arm 17 is still in the line-releasing posture, the rotor driving mechanism 5 rotates the rotor 3 in the direction taking up line. When the rotor 3 rotates in the direction taking up line, the bail tripping mechanism 18 restores the bail arm 17 into the line-guiding posture.

To be more specific, in FIGS. 5 and 6, the shifting member 51 turns clockwise together with the rotor 3. The roller 59 mounted to the rear end portion 51c of the shifting member 51 abuts against the inclined surface 60a of the switching member 52 fixed to the reel unit 2. This pushes the shifting member 51 forward, switching it to the withdrawn position indicated by the phantom line in FIG. 6, and pivoting the first bail support member 40 into the line-guiding posture. Thus, the rod 55 of the toggle spring mechanism 50 pivots from the second position shown in FIG. 3B toward the first position shown in FIG. 3A. Then, as the dead point is crossed, the spring force of the coil spring 57 pushes the rod 55 out, switching the bail arm 17 to the line-guiding position. This line-guiding position is maintained by the spring force. When the bail arm 17 is restored to the line-guiding position, the first bail support member 40 and the second bail support member 42 both point to the front, as shown in FIGS. 1 and 2. When the bail arm 17 has returned to the line-guiding position, the fishing line is guided to the spool 4 by the bail arm 17, and wound around the spool 4.

Second Embodiment

Figure 7:
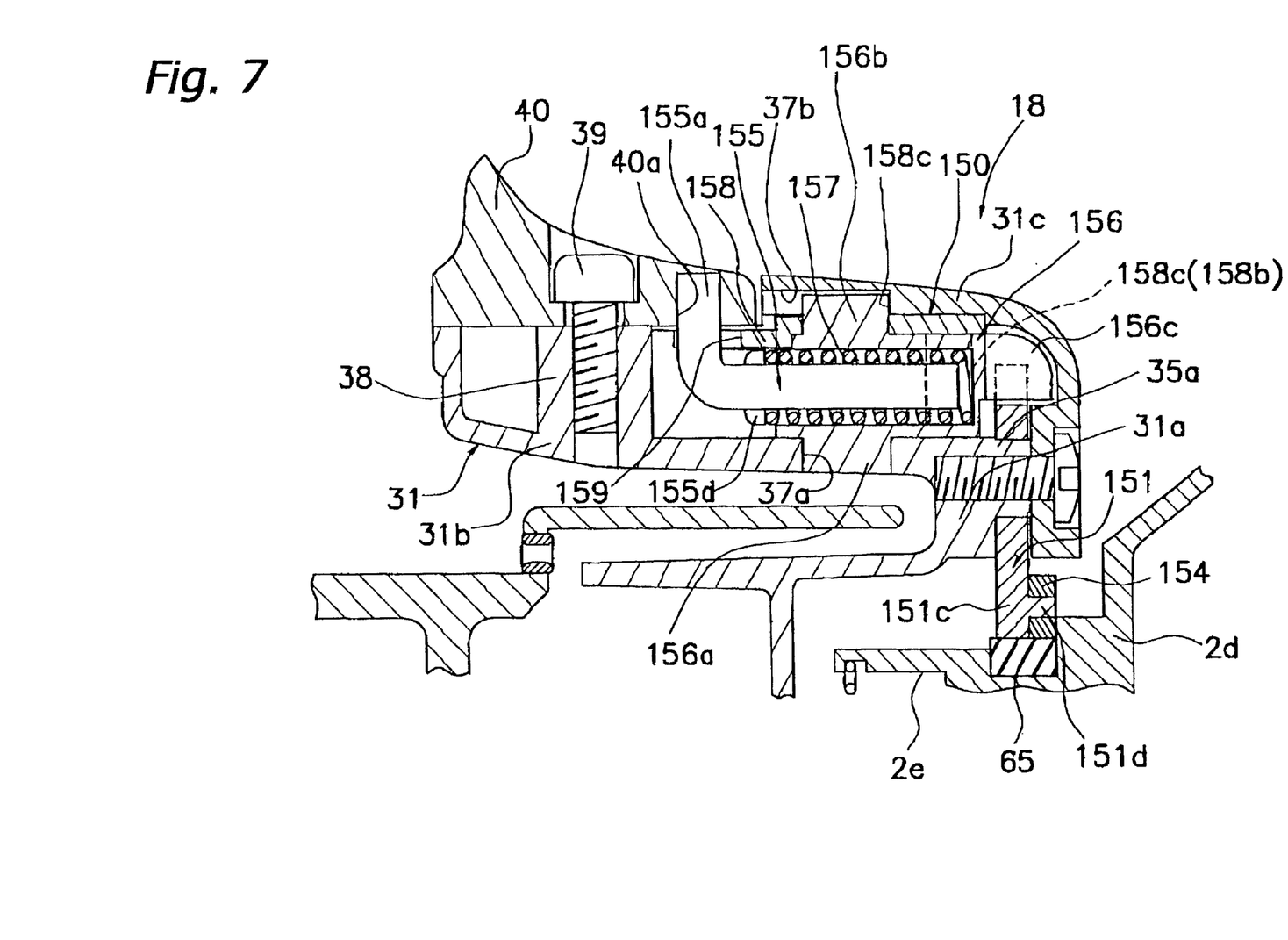
FIG. 7 is a magnified cross-sectional view of the first rotor arm in accordance with a second embodiment.
Figure 8A:
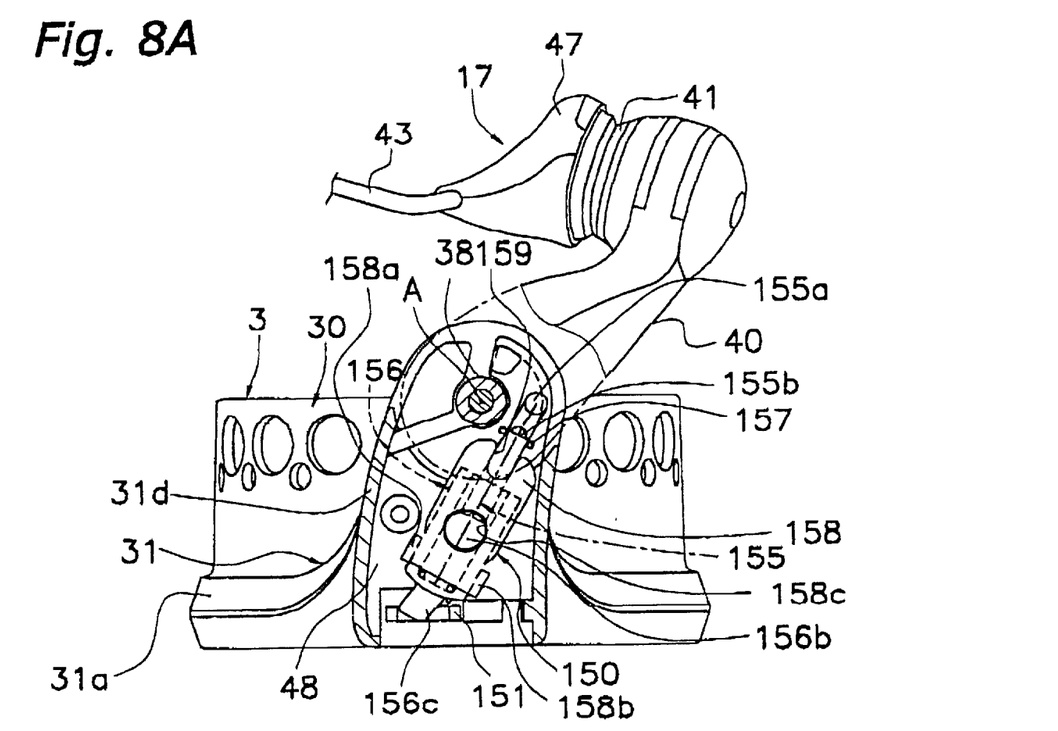
FIG. 8A is a plan view of the first rotor arm in which the bail arm is in the line-guiding posture in accordance with the second embodiment.
Figure 8B:
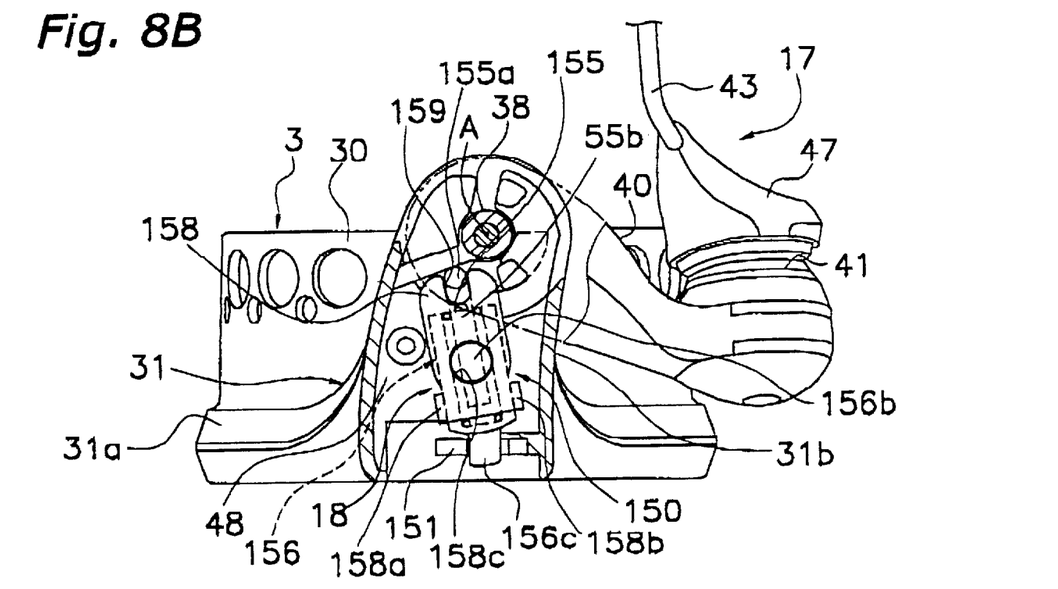
FIG. 8B is a plan view of the first rotor arm in which the bail arm is in the line-releasing posture in accordance with the second embodiment.
Figure 9:
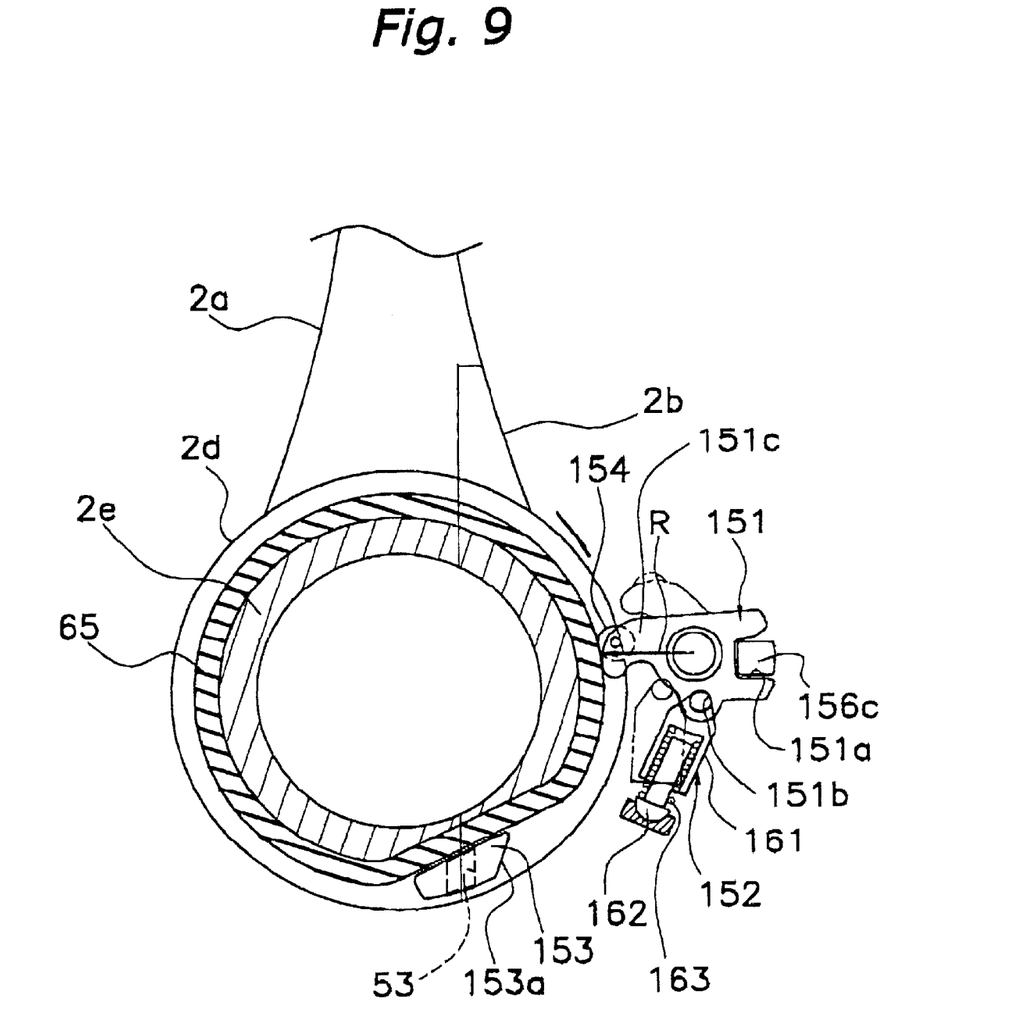
FIG. 9 is a front view of the reel body, illustrating the bail tripping mechanism in accordance with the second embodiment.

In the first embodiment, the shifting mechanism was made of a shifting member 51 that shifts back and forth, but it is also possible that the shifting mechanism includes a return lever 151 that pivots around an axis that is parallel to the spool shaft 15. As shown in FIGS. 7 to 9, the bail tripping mechanism 18 includes a first toggle spring mechanism 150, a return lever 151, a second toggle spring mechanism 152, and a switching member 153. The first toggle spring mechanism 150 is mounted pivotably to the first arm portion 31b and the first cover member 31c inside the accommodation space 48. The return lever 151 is mounted pivotably to the rear wall of the first connection portion 31a. The second toggle spring mechanism 152 holds the return lever 151. The switching member 153 is formed in the flange portion 2d at the front of the reel body 2a.

The first toggle spring mechanism 150 is disposed inside the first rotor arm 31, such that the bail arm 17 can assume a first position corresponding to the line-guiding posture and a second position corresponding to the line-releasing posture. The purpose of the first toggle spring mechanism 150 is to hold the bail arm 17 in the line-guiding posture or the line-releasing posture. The first toggle spring mechanism 150 includes a first rod 155, a first guide member 156, a first coil spring 157 and an interlocking member 158. One end of the first rod 155 interlocks with the first bail support member 40, and the other end extends along the first arm portion 31b. The first guide member 156 is mounted such that the first rod 155 can advance from or retreat into it, and its middle is pivotably attached to the first arm portion 31b. The first coil spring 157 urges the first rod 155 outward. The interlocking member 158 is mounted immovably to the first guide member 156 such that it can interlock with the first rod 155 in pivoting direction at least in an intermediate pivoting position.

As shown in FIG. 7, the tip 155a of the first rod 155 is bent outwards, interlocking the first rod 155 with the engagement hole 40a formed in the first bail support member 40. Furthermore, a protrusion 155b for interlocking with the spring is formed on the outer peripheral surface of the first rod 155.

The first guide member 156 is an angular cylinder with a bottom that is open to the front, and includes, at an axial intermediate position, pivoting shafts 156a and 156b that protrude outward on both sides and engage with an installation hole 37a formed in the first arm member 31b and an installation hole 37b formed in the first cover member 31c. The pivoting shafts 156a and 156b are disposed along the radial direction of the rotor 3, and the first guide member 156 is attached to the first rotor arm 31, pivotably around the pivot shafts 156a and 156b. At the rear end portion (right end in FIG. 7) of the first guide member 156, a rearward protruding interlocking protrusion 156c is formed, which engages with the return lever 151. The interlocking member 158 is a plate-shaped member that is immovably fixed to the outer side of the first guide member 156 (upper side in FIG. 7). The front end portion of the interlocking member 158 extends frontward from the front end portion of the first guide member 156. An interlocking groove 159 is formed at this extended front end of the interlocking member 158. The interlocking groove 159 interlocks with the bent front end portion 155a of the first rod 155 in the pivoting direction of the first guide member 156, and is formed along the advance/retreat direction of the first rod 155. The length of this interlocking groove 159 is set such that the first rod 155 can be interlocked near the dead point of the first toggle spring mechanism 150, and is determined under consideration of such factors as the interference of the boss portion 38. More specifically, its length is 10% to 50% of the distance from the position of the first rod 155 in the dead point when pivoting the bail arm 17 to the position when the first rod 155 has moved out most. In particular, if the dead point position is designed to be closer to the line-releasing posture in order to facilitate the returning of the bail arm 17, then it is preferable that the length is such that in the second position (line-releasing posture), the first rod 155 can interlock with the interlocking member 158.

Here, "dead point position" means the position in which the pivot center of the first bail support member 40, the pivot center of the first toggle spring mechanism 150 (pivot center of the first guide member 156), and the place where the first rod 155 interlocks with the first bail support member 40 all lie on one straight line. In this situation, the first rod 155 is most receded into the first guide member 156, and the first coil spring 157 is most compressed.

The rear end portion of the interlocking member 158 is provided with a pair of attachment pieces 158a and 158b extending on both sides along the first guide member 156. Furthermore, the middle of the interlocking member 158 is provided with a fitting hole 158c into which the pivoting shaft 156b is fitted. The attachment pieces 158a and 158b and the fitting hole 158c fasten the interlocking member 158 immovably to the first guide member 156.

With this configuration, the first toggle spring mechanism 150 can assume a first position as shown in FIG. 8A and a second position as shown in FIG. 8B. The first position corresponds to the line-guiding posture of the bail arm 17, whereas the second position corresponds to the line-releasing posture of the bail arm 17.

As shown in FIG. 7 and FIG. 9, the return lever 151 is attached to the boss portion 35a formed at the rear wall of the first connection portion 31a, and is pivotable within a plane that is parallel to the rotation plane of the rotor. The return lever 151 includes an interlocking cutout 151a, an interlocking hole 151b, a protrusion 151c. The interlocking cutout 151a interlocks with the interlocking protrusion of the first guide member 156 of the first toggle spring mechanism 150. The interlocking hole 151b interlocks with the second toggle spring mechanism 152. The protrusion 151c can protrude toward the rotation axis of the rotor. A gap is formed between the interlocking cutout 151a and the interlocking protrusion 156c of the first guide member 156. This gap causes a collision sound when switching the position of the first guide member 156 and the return lever 151. This lets the user know that the posture of the bail arm 17 has been switched. A roller 154 is mounted rotatably to the protrusion 151c. The roller 154 is mounted rotatably to an attachment pin 151d formed protruding from the rear side (below the paper plane in FIG. 9) of the protrusion 151c, and can contact an inclined surface 153a of the switching member 153. Because also this roller 154 rotates like the roller 59 upon collision with the switching member 153, damage to the switching member 153 is less likely to occur.

The braking member 65, which is made of a ring-shaped elastic member with rectangular cross section, is mounted to the cylindrical portion 2e, such that it can contact the protrusion 151c of the return lever 151. The braking member 65 is provided in order to brake the rotation of the rotor 3 when the bail arm 17 is in the line-releasing posture. The tip of the protrusion 151c is shaped like a circular arc with a radius R defined by the pivoting center of the return lever 151. Making the protrusion 151c circular arc-shaped ensures that even when the return lever 151 pivots somewhat due to wobbling when the rotor 3 rotates during braking, the protrusion 151c always cuts into the outer peripheral surface of the braking member 65 by the same amount, so that the contact state is not likely to vary. Thus, even if the rotor 3 is turned by hand, the braking force is not likely to vary, and a stable braking force can be attained.

The second toggle spring mechanism 152 is for holding the return lever 151 in the first position or the second position, and via the return lever 151, also holds the first toggle spring mechanism 150 in the first position or the second position. The second toggle spring mechanism 152 includes a second guide member 161, a second rod 162 and a second coil spring 163. The second guide member 161 interlocks with the return lever 151. One end of the second rod 162 is accommodated by the second guide member 161, and the other end is pivotably attached to the rotor 3. The second coil spring 163 urges the second guide member 161 toward the return lever 151. It should be noted that the second guide member 161 and the second coil spring 163 move within a plane that is parallel to the rotation plane of the rotor 3.

With this configuration of return lever 151 and second toggle spring mechanism 152, the return lever 151 can assume a first position indicated by the phantom line in FIG. 9 and a second position indicated by the solid line in FIG. 9, due to the second guide member 161 and the second coil spring 163. The first position corresponds to the first position of the first toggle spring mechanism 150 and the line-guiding posture of the bail arm 17, whereas the second position corresponds to the second position of the first toggle spring mechanism 150 and the line-releasing posture of the bail arm 17.

The switching member 153 is made of a synthetic resin and, as shown in FIG. 9, is clipped to the portion where the reel body 2a and the lid member 2b can be taken apart, as in the first embodiment. The switching member 153 is disposed on the outer peripheral side of the braking member 65, which can be arranged approximately annularly. The switching member 153 has an inclined surface 153a whose downstream side (left hand side in FIG. 9) in the fishing line take-up rotation direction of the rotor 3 (direction of the arrow in FIG. 9) protrudes more outward in radial direction than the upstream side (right hand side in FIG. 9). When the return lever 151 rotates together with the rotor 3, the switching member 153 can abut against the protrusion 151c of the return lever 151.

Function and Operation of the Reel

When casting, the reverse rotation check mechanism 70 blocks reverse rotation of the rotor 3, and the bail arm 17 trips into the line-releasing posture. Tripping the bail arm 17 into the line-releasing posture causes the first bail support member 40 and the second bail support member 42 to flip over backwards, thus assuming the second position shown in FIG. 8B. When the bail arm 17 has flipped into the line-releasing posture, fishing line can be rolled off easily from the spool 4.

When pivoting from the line-guiding posture to the line-releasing posture, the rotation of the first bail support member 40 causes the first rod 155 of the first toggle spring mechanism 150 to pivot in counter-clockwise direction in FIG. 8A while retreating gradually, thereby assuming the second position shown in FIG. 8B. When doing so, it retreats to the dead point, and after crossing the dead point bolts forward. Moreover, while receding, until the first rod 155 interlocks with the interlocking member 158, a force is transmitted indirectly from the first rod 155 via the first coil spring 157 to the first guide member 156, and the first guide member 156 is pushed accordingly and pivots counter-clockwise around the pivot center A. Near the dead point, as the first rod 155 interlocks with the interlocking member 158, the force is transmitted directly from the first rod 155 via the interlocking member 158 to the first guide member 156. When the dead point is crossed, the spring force of the coil spring 157 pushes the rod 155 out, whereby the bail arm 17 switches to the line-releasing posture, which is held by the spring force.

Here, the interlocking member 158 is provided immovably on the first guide member 156, and interlocks in pivot direction with the first rod 155, so that when the first rod 155 pushes against the first guide member 156 via the interlocking member 158, the force is transmitted efficiently from the first rod 155 to the first guide member 156. This improves a feeling of sturdiness during the pivoting, and enhances the pivoting feeling.

When the first guide member 156 pivots into the second position, the pivoting causes the return lever 151 to pivot clockwise in FIG. 9, and it assumes the second position indicated by the solid line. In this situation, the return lever 151 is held by the second toggle spring mechanism 152.

When the return lever 151 is pivoted into this second position, then, as shown in FIG. 9, the protrusion 151c of the return lever 151 protrudes toward the rotation axis of the rotor 3 and elastically contacts the braking member 65. As a result, the rotor 3 is braked and its rotational orientation is maintained. However, since the protrusion 151c contacts the braking member 65 elastically and brakes it only by friction, the rotational orientation of the rotor 3 can be easily adjusted by turning it by hand or with the handle 1. This means, the rotational orientation is maintained by the frictional force braking the rotor 3, so that the rotor 3 does not rotate when the bail arm 17 is in the line-releasing posture. This counters the problem that the rotor 3 suddenly starts to rotate when casting or feathering. Also, since the rotor 3 is braked by friction only, it is easy to adjust its rotational orientation by applying a force to the rotor 3.

In this situation, the fishing rod is cast while holding fishing line with the index finger of the hand with which the fishing rod is held. Thus, fishing line is released with high momentum due to the weight of the tackle.

After the casting, when the handle 1 is turned, for example with the left hand, in the direction taking up line while the bail arm 17 is still in the line-releasing posture, the rotor driving mechanism 5 rotates the rotor 3 in the direction taking up line. When the rotor 3 rotates in the direction taking up line, the bail tripping mechanism 18 restores the bail arm 17 into the line-guiding posture.

To be more specific, in FIG. 9, the return lever 151 turns counter-clockwise together with the rotor 3. Thus, the roller 154 mounted to the protrusion 151c of the return lever 151 abuts against the switching member 153 fixed to the side of the reel unit 2. This pushes the return lever 151 upward, switching it to the first position indicated by the phantom line in FIG. 9. After the collision, the roller 154 contacts the switching member 153 while rolling, so that the switching member 153 is not likely to be damaged.

As the return lever 151 is switched to the first position, the first guide member 156 of the first toggle spring mechanism 150 pivots from the second position shown in FIG. 8B to the first position shown in FIG. 8A. During the pivoting, the interlocking member 158 is interlocked with the first rod 155, so that the force is transmitted efficiently from the first guide member 156 to the first rod 155. Then, as the dead point is crossed, the spring force of the first coil spring 157 pushes the first rod 155 out, switching the bail arm 17 to the line-guiding posture, which is held by the spring force.

In the second position of the first toggle spring mechanism 150, the first rod 155 is positioned from the dead point only slightly toward the line-releasing posture, so that it can be put into the first position by applying only a little force with the return lever 151. Also, the return lever 151 rotates within the rotation plane of the rotor, so that the rotation force of the rotor 3 can be transmitted directly and efficiently to the return lever 151. Consequently, when operating the handle, it is possible to switch the bail with little force from the line-releasing posture to the line-guiding posture. And furthermore, since the first rod 155 is interlocked with the interlocking member 158 when starting to pivot from the line-releasing posture, the force is transmitted efficiently, the play in the first toggle spring mechanism 150 is reduced, and the bail tripping is carried out with a sense of sturdiness.

When the bail arm 17 is restored to the line-guiding posture, the first bail support member 40 and the second bail support member 42 are both in an upright position extending frontward, as shown in FIGS. 1 and 2. In this situation, in the first toggle spring mechanism 150, the first guide member 156 is pivoted clockwise by the first coil spring 157 as shown in FIG. 8A, and the first rod 155 is pushed out. In this situation, force is transmitted efficiently from the first guide member 156 to the first rod 155, so that even when the dead point position is arranged closer to the line-guiding-posture than conventionally, the bail arm 17 can be returned instantly to the line-guiding posture. Consequently, it is possible to increase the spring force of the first toggle spring mechanism 150 during the line-guiding posture, and to maintain the force that is keeping the bail arm 17 in the line-guiding posture high.

Furthermore, in the line-guiding posture, the return lever 151 is in the first position indicated by the phantom line in FIG. 9. In this situation, the return lever 151 is held by the second toggle spring mechanism 152. In this situation, the protrusion 151c of the return lever 151 recedes to the outer peripheral side of the rotor 3, so that the protrusion 151c does not abut against the switching member 153 even when the rotor 3 rotates.

When bail arm 17 returns to the line-guiding posture, the fishing line is guided by the bail arm 17 to the spool 4, and is wound around the spool 4.

Figure 10:
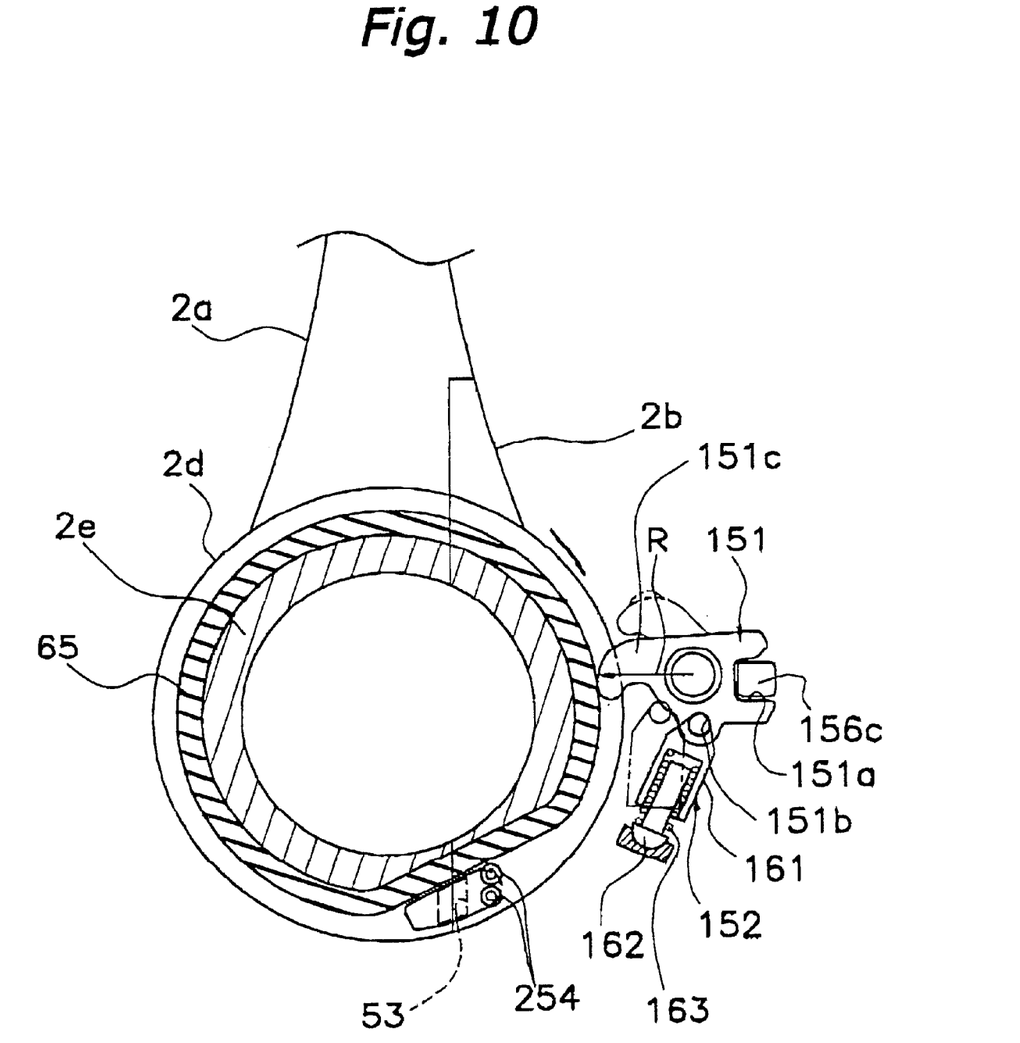
FIG. 10 is a front view of the reel body, illustrating the bail tripping mechanism in accordance with still another embodiment.

Other Embodiments (a) In the preceding embodiments, the roller was attached to the shifting member 51 or the return lever 151, but it is also possible that a revolving member such as a roller or a roll is provided on the fixed switching member. In this case, as shown in FIG. 10, if a plurality of revolving members 254 is provided, the movement of the switching member 51 or the return lever 151 after the collision becomes even smoother. It is also possible to use a circulating endless belt as the revolving member.

(b) In the preceding embodiments, the bail tripping mechanism 18 was mounted to the first rotor arm 31, but it can also be mounted to the second rotor arm 32.

(c) In the first embodiment, the shifting member 51 contacted the outer peripheral surface of the braking member 65, but it can also be devised to contact the front end surface of the braking member 65.

With the present invention, when the shifting mechanism and the switching member collide, the revolving member provided either on a contact portion of the shifting mechanism or a contact portion of the switching portion collides with the other component (i.e. switching portion or shifting mechanism), so that after the collision, the revolving member rotates and rolls against the other component. Thus, when the shifting mechanism or the switching portion collides with the revolving member, neither will be damaged, and due to the rolling contact, also the friction force is not large. Consequently, the bail arm can be restored smoothly to the line-guiding posture.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application No.2001-116313. The entire disclosure of Japanese Patent Application No.2001-116313 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A bail tripping device for use in a spinning reel having a spinning reel unit having a braking member attached thereto and a rotor having a bail arm, the bail arm being pivotable about a pivot axis and fitted to the rotor pivotably between a line-guiding posture and a line-releasing posture, the rotor being rotatably attached to the spinning reel unit, said bail tripping device being for returning a bail arm from the line-releasing posture to the line-guiding posture in cooperation with rotation of the rotor in its line-guiding direction, said bail tripping device comprising:
a shifting mechanism provided in the rotor for shifting between a first position and a second position when the bail arm pivots, the first position corresponding to the line-guiding posture, the second position corresponding to the line-releasing posture, said shifting mechanism having a protruding portion that protrudes toward a front portion of the reel unit when said shifting mechanism is in the second position;
a switching portion arranged at the front of the reel unit, said switching portion being for contacting said protruding portion of said shifting mechanism when said shifting mechanism is at its second position and shifting said shifting mechanism toward the first position when the rotor rotates in the line-guiding direction; and
a revolving member provided on a portion of one of said shifting mechanism and said switching portion, said revolving member having an end portion that is adapted to contact the braking member to generate a braking force, and a roller portion that is attached adjacent to said end portion, such that said roller portion rolls against said switching portion.

2. The bail tripping device as set forth in claim 1, wherein said shifting mechanism includes a shifting member having a first end and a second end, the first end being located near a pivot center of the bail arm and rotatably interlocked with said bail arm at a position that is, when the bail arm is in the line-releasing posture, on a line-guiding posture side relative to a line segment connecting the second end of said shifting member and the pivot center, the second end of said shifting member shifting back and forth in cooperation with the pivoting of the bail arm.

3. The bail tripping device as set forth in claim 2, wherein said shifting member is a rod-shaped member whose first end is bent toward the pivoting center of the bail arm to engage the bail arm and extends along the pivot axis, and whose second end is bent toward a rotation axis of the rotor, said shifting member being arranged between the first end and the second end so as to extend along the rotation axis of the rotor, and
the second end is axially movably engaged with the rotor.

4. The bail tripping device as set forth in claim 3, wherein said revolving member is a cylindrical member that is mounted rotatably to the second end of said shifting member.

5. The bail tripping device as set forth in claim 2, wherein the shifting mechanism further includes a toggle spring mechanism whose one end is rotatably interlocked with the bail arm at a position that is different from the position at which said shifting member is interlocked, said toggle spring mechanism toggling and urging the bail arm into the line-guiding posture and the line-releasing posture.

6. The bail tripping device as set forth in claim 2, wherein said switching portion has an inclined surface whose downstream side in a line-guiding rotation direction of the rotor protrudes from the front of the reel unit towards the rotor more than its upstream side.

7. The bail tripping device as set forth in claim 1, wherein said shifting mechanism includes
a toggle spring mechanism whose first end is rotatably mounted to a position near a pivot center of the bail arm, said toggle spring mechanism being pivotably interlocked with the rotor at an intermediate position of said toggle spring mechanism; and
a return lever for interlocking with a second end of the toggle spring mechanism, said return lever being mounted to a rear wall of the rotor, pivotably around an axis that is parallel to the rotation axis of the rotor, such that a tip of said return lever can contact said switching portion.

8. The bail tripping device as set forth in claim 7, wherein said switching portion has an inclined surface whose downstream side in a line-guiding rotation direction of the rotor protrudes more in radial direction than its upstream side.

9. The bail tripping device as set forth in claim 7, wherein said revolving member is mounted rotatably to a tip of said return lever.

10. A spinning reel, comprising:

a handle;

a reel unit rotatably supporting said handle and having a braking member attached thereto;

a rotor rotatably supported at a front portion of said reel unit and having a rotor unit, a bail arm, and a bail tripping mechanism, said bail arm being fitted to said rotor unit and pivotable about a pivot axis between a line-guiding posture and a line-releasing posture, said bail tripping device being for returning a bail arm from the line-releasing posture to the line-guiding posture in cooperation with rotation of said rotor in its line-guiding direction, said bail tripping device comprising

- a shifting mechanism for shifting between a first position and a second position when said bail arm pivots, the first position corresponding to the line-guiding posture, the second position corresponding to the line-releasing posture, said shifting mechanism having a protruding portion that protrudes toward said front portion of the reel unit when said shifting mechanism is in the second position,
- a switching portion arranged at said front portion of said reel unit, said switching portion being for contacting said protruding portion of said shifting mechanism when said shifting mechanism is at its second position and shifting said shifting mechanism toward the first position when said rotor rotates in the line-guiding direction, and
- a revolving member provided on a portion of one of said shifting mechanism and said switching portion, said revolving member having an end portion that is adapted to contact the braking member to generate a braking force, and a roller portion that is attached adjacent to said end portion, such that said roller portion rolls against said switching portion; and a spool disposed at a front portion of said rotor so as to be able to shift front and back.

11. The spinning reel as set forth in claim 10, wherein said shifting mechanism includes a shifting member having a first end and a second end, the first end being located near a pivot center of said bail arm and rotatably interlocked with said bail arm at a position that is, when said bail arm is in the line-releasing posture, on a line-guiding posture side of a line segment connecting the second end of said shifting member and the pivot center, the second end of said shifting member shifting back and forth in cooperation with the pivoting of said bail arm.

12. The spinning reel as set forth in claim 11, wherein said shifting member is a rod-shaped member whose first end is bent toward the pivoting center of said bail arm to engage said bail arm and extends along the pivot axis, and whose second end is bent toward a rotation axis of said rotor, said shifting member being arranged between the first end and the second end so as to extend along the rotation axis of said rotor, and the second end is axially movably engaged with the rotor.

13. The spinning reel as set forth in claim 11, wherein said revolving member is a cylindrical member that is mounted rotatably to the second end of said shifting member.

14. The spinning reel as set forth in claim 11, wherein said shifting mechanism further includes a toggle spring mechanism whose one end is rotatably interlocked with said bail arm at a position that is different from the position at which said shifting member is interlocked, said toggle spring mechanism toggling and urging said bail arm into the line-guiding posture and the line-releasing posture.

15. The spinning reel as set forth in claim 11, wherein said switching portion has an inclined surface whose downstream side in a line-guiding rotation direction of the rotor protrudes from the front of the reel unit towards the rotor more than its upstream side.

16. The spinning reel as set forth in claim 10, wherein said shifting mechanism includes

- a toggle spring mechanism whose first end is rotatably mounted to a position near a pivot center of said bail arm, said toggle spring mechanism being pivotably interlocked with said rotor at an intermediate position of said toggle spring mechanism; and
- a return lever for interlocking with a second end of the toggle spring mechanism, said return lever being mounted to a rear wall of said rotor, pivotably around an axis that is parallel to the rotation axis of said rotor, such that a tip of said return lever can contact said switching portion.

17. The spinning reel as set forth in claim 16, wherein said switching portion has an inclined surface whose downstream side in a line-guiding rotation direction of said rotor protrudes more in radial direction than its upstream side.

18. The spinning reel as set forth in claim 16, wherein said revolving member is mounted rotatably to a tip of said return lever.

* * * * *